UNITED STATES PATENT OFFICE.

WALTER KIRCHNER, OF GRÜNAU, NEAR BERLIN, GERMANY, ASSIGNOR TO THE CHE-
MISCHE FABRIK GRÜNAU LANDSHOFF AND MEYER, AKTIENGESELLSCHAFT, OF
GRÜNAU, NEAR BERLIN, GERMANY.

PROCESS FOR THE MANUFACTURE OF BARIUM OXID.

1,047,077.      Specification of Letters Patent.    Patented Dec. 10, 1912.

No Drawing.     Application filed March 21, 1912. Serial No. 685,265.

*To all whom it may concern:*

Be it known that I, WALTER KIRCHNER, engineer, a subject of the King of Saxony, residing at Grünau, near Berlin, Germany, have invented a certain new and useful Process for the Manufacture of Barium Oxid, of which the following is a specification.

Barium oxid is obtained by heating barium carbonate or barium nitrate. It is well known to manufacturers that it is a simple matter to produce from the nitrate an oxid suitable for the manufacture of a high-grade peroxid, viz: one containing about 90 per cent. of $BaO_2$, but the production of an equally active oxid from the carbonate has hitherto seemed to be impracticable. The solution of this problem has been attempted by many investigators, but none of the processes hitherto known seem to have met with success, for there is no barium peroxid in commerce, which has been produced from carbonate so as to contain 90% of $BaO_2$.

I have discovered, that it is only necessary, to keep the carbonic acid of the heating gases away from the product of heating, in order to obtain barium-oxid of more than 90% strength. All other conditions, which have been considered injurious, such as moisture, unequal temperature, and acid nature of the crucible material, have no injurious effect on the formation of the barium oxid.

This surprising invention is illustrated by the following example:

Example: A mixture of barium carbonate with about 6% of pine soot is introduced into an absolutely gas tight crucible, for instance a quartz crucible, whose lid has been tightly mounted by means of a fire-proof cement, and which has a small vent for the discharge of the gases which are formed. The mixture may be moist. The crucible is preferably heated in a muffle oven to 1150° C. for about 3 hours. The temperature may vary between 1000 and 1100° C. or higher. The product obtained is a friable—and exceedingly porus barium oxid containing only traces of carbonic acid. With water it reacts very violently and by suitable oxidation it yields a peroxid of more than 90%. The crucible is affected only slightly if at all. This result is new and unexpected, because under conditions, which hitherto were supposed to be unfavorable, a barium oxid of excellent quality was obtained.

The discovery that it is only necessary to keep the carbonic acid of the heating gases away from the barium oxid by the use of a perfectly gas-tight crucible, and the fact that all previous assumptions are thereby shown to be erroneous represents a very important advance, inasmuch as it has shown new methods for the manufacture of barium oxid from the carbonate.

The great value of the invention is due to the following facts: For the process of heating barium carbonate the manufacturer is not restricted either to an anhydrous starting material, or to exactly constant temperatures, or to a crucible or oven made of any special material. As only a single condition is necessary, viz: protection against the carbonic acid of the heating gases, the crucible or oven may be made of any material which is gas-tight at the temperature employed. These materials include, in addition to porcelain, quartz, etc., all refractory metals and alloys, especially those kinds of iron which have a high melting point.

What I claim is:—

The process for the manufacture of barium oxid from barium carbonate, which consists in heating the barium carbonate in a receptacle made of material impervious to the gases of combustion when the receptacle is subjected to high temperatures, in order to prevent any contact of the heated material with the carbonic acid of the heating gases, substantially as described.

In testimony whereof I have hereunto set my hand in presence of two subscribing witnesses.

WALTER KIRCHNER.

Witnesses:
  EMIL FRANKE,
  HENRY HASPER.